US006523878B2

(12) United States Patent
Scheidel

(10) Patent No.: US 6,523,878 B2
(45) Date of Patent: Feb. 25, 2003

(54) CROSSMEMBER FOR A VEHICLE INSTRUMENT PANEL AND A METHOD OF MAKING SAME

(75) Inventor: Robert Scheidel, Eppingen (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/061,172

(22) Filed: Feb. 4, 2002

(65) Prior Publication Data

US 2002/0105204 A1 Aug. 8, 2002

(30) Foreign Application Priority Data

Feb. 2, 2001 (DE) ......................................... 101 04 790

(51) Int. Cl.⁷ .............................................. B62D 25/14
(52) U.S. Cl. ............................. 296/70; 296/72; 180/90; 280/779
(58) Field of Search ................................ 296/187, 192, 296/193, 205, 70, 72, 71, 194, 197; 280/779, 752; 180/90

(56) References Cited

U.S. PATENT DOCUMENTS

| 5,564,769 | A | * | 10/1996 | Deneau et al. ................ | 296/72 |
| 5,868,426 | A | * | 2/1999 | Edwards et al. .............. | 296/70 |
| 5,931,520 | A | | 8/1999 | Seksaria et al. | |
| 5,934,733 | A | * | 8/1999 | Manwaring .................... | 296/72 |
| 6,086,098 | A | * | 7/2000 | Reiter et al. .................. | 296/70 |
| 6,276,740 | B1 | * | 8/2001 | Mellor et al. ................. | 296/72 |
| 6,296,303 | B1 | * | 10/2001 | Kamiya et al. ............... | 296/70 |
| 6,315,347 | B1 | * | 11/2001 | Gotz ............................ | 296/72 |
| 6,325,440 | B1 | * | 12/2001 | Emmerich .................... | 296/72 |
| 6,382,695 | B1 | * | 5/2002 | Decome ....................... | 256/72 |
| 6,450,533 | B1 | * | 9/2002 | Kimura et al. ................ | 296/72 |
| 2002/0050726 | A1 | * | 5/2002 | Okana et al. ................. | 296/70 |
| 2002/0056982 | A1 | * | 5/2002 | Brownlee et al. ............ | 280/779 |
| 2002/0105204 | A1 | * | 8/2002 | Scheidel ....................... | 296/70 |

FOREIGN PATENT DOCUMENTS

| DE | 19547858 | 7/1997 |
| DE | 19715069 | 10/1997 |
| DE | 196 18 626 | 11/1997 |
| DE | 19618626 | 11/1997 |
| DE | 19830303 | 1/2000 |
| DE | 19756334 | 4/2000 |

OTHER PUBLICATIONS

Search Report.

* cited by examiner

Primary Examiner—D. Glenn Dayoan
Assistant Examiner—Jason Morrow
(74) Attorney, Agent, or Firm—Crowell & Moring LLP

(57) ABSTRACT

A crossmember for an instrument panel of a vehicle, especially a passenger car, which can be mounted, crosswise, in the vehicle forestructure, with its ends being mounted on opposite body components. The crossmember comprises a tubular main support bar, several mounting brackets attached to the main support bar at a distance from one another and designed for use in fastening the crossmember to the body of the vehicle, and at least one bracket designed to hold a bolt-on component of the instrument panel. At least one flat alignment surface is formed on the main support bar via internal high-pressure metal forming, and the bracket is equipped with one or more flat stop surfaces that rest against the alignment surface. In order to keep production of the crossmember cost-effective while enabling a precise alignment or positioning of the brackets on the main support bar, it is envisioned that at least first and second flat alignment surfaces for the brackets are provided on the main support bar, that the two alignment surfaces, viewed in a circumferential direction around the main support bar, are positioned with a gap between them, that the bracket is equipped with at least two flat stop surfaces, and that the bracket is permanently welded to the main support bar.

23 Claims, 4 Drawing Sheets

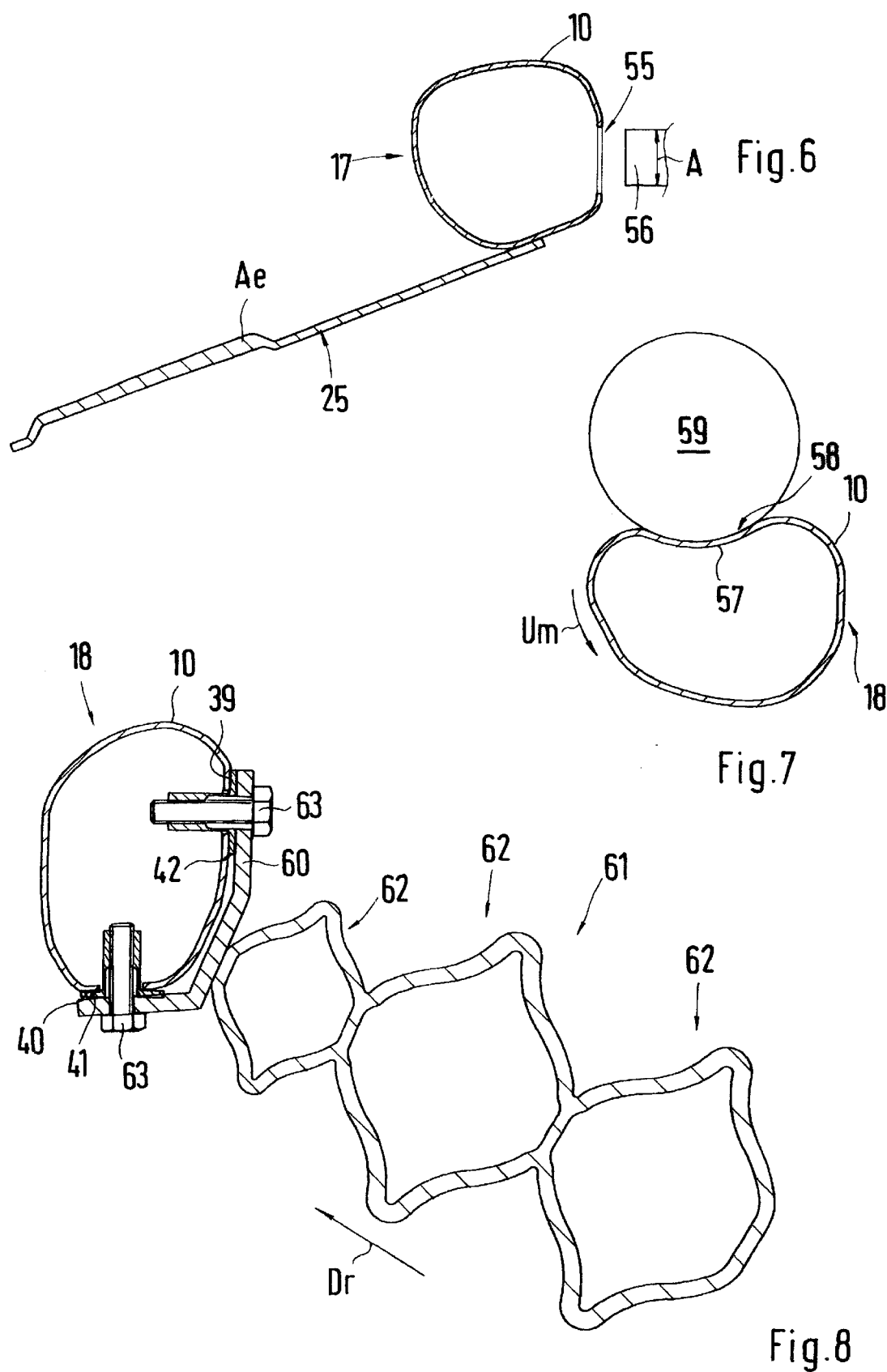

CROSSMEMBER FOR A VEHICLE INSTRUMENT PANEL AND A METHOD OF MAKING SAME

BACKGROUND AND SUMMARY OF THE INVENTION

This application claims the priority of German application DE 101 04 790.8, filed on Feb. 2, 2001, the disclosure of which is expressly incorporated by reference herein.

The invention relates to a crossmember for an instrument panel of a vehicle which can be mounted, crosswise, in the vehicle forestructure, with its two ends mounted on opposite body components, the crossmember comprising a tubular main support bar, several mounting brackets positioned on said main support bar with spaces therebetween and designed for mounting the crossmember on the sides of the vehicle body, and at least one bracket designed to hold a bolt-on component of the instrument panel, wherein at least one flat alignment surface is formed on the main support bar via internal, high-pressure metal forming, and the at least one bracket includes one or more flat stop surfaces that rest up against the alignment surface.

A crossmember for an instrument panel, also called a cockpit crossmember, is known from German Patent Document 196 18 626 A1. This crossmember is equipped with a main support bar, which comprises a hollow, profiled element that is circular in cross-section. The arrangement further comprises two mounting brackets, one at either end of the tubular main support bar, which serve to connect the cockpit crossmember to opposite components of the vehicle body. Further, at least one bracket designed to hold a bolt-on component of the cockpit, also referred to as the instrument panel, is also included on the main support bar. As is illustrated in this publication, a flat alignment surface is formed on the main support bar via internal high-pressure metal forming. A flat mounting face that is formed on the bracket rests up against this alignment surface. To enable this bracket to be fastened to the main support bar, the main support bar is shaped during the internal high-pressure metal forming process such that it will hold a mounting element that is attached to the bracket. To produce the known cockpit crossmember, both the main support bar and the bracket to be fastened thereon are placed in recesses into a form that contains impressions, into which the main support bar material can flow during the internal high-pressure metal forming process. The disadvantage of this known cockpit crossmember is that it is costly to produce.

It is thus an aspect of the invention to create a crossmember of the type described above that will allow bolt-on components of the instrument panel to be precisely positioned, while the production of the crossmember remains simple.

This aspect is attained, in certain preferred embodiments of the invention, with a crossmember for an instrument panel of a vehicle, especially a passenger car, having at least first and second flat alignment surfaces for the at least one bracket provided on the main support bar, wherein the two alignment surfaces, viewed in a circumferential direction around the main support bar, are spaced a certain distance from one another, wherein the bracket comprises at least two flat stop surfaces, and wherein the bracket is permanently welded to the main support bar. Further advantageous embodiments of the crossmember are provided in further embodiments.

Advantages provided by the crossmember specified in certain preferred embodiments of the invention, hereinafter referred to as the cockpit crossmember, are that the bracket can be mounted on the main support bar without being taken up in a mold. With the two alignment surfaces, the bracket can be positioned precisely on the main support bar and then welded to it. Furthermore, by welding the bracket to the main support bar, a secure and permanent bond can be guaranteed. By precise alignment of the bracket position, bolt-on components of the cockpit or the instrument panel can also be attached in precise alignment, thus allowing basically equal spacing between bolt-on components on the finished instrument panel, resulting in an advantageous or attractive form for the cockpit.

A possibility for mounting an additional bolt-on component, or an additional bracket, in the cockpit is specified in certain further embodiments by at least one flat, third alignment surface formed on the main support bar and containing at least one opening into which a snap or rivet nut can be inserted for mounting an additional bolt-on component of the instrument panel to the support bar. Because the snap nut or rivet nut lies up against the flat alignment surface, this nut is aligned precisely on the main support bar, so that the bolt-on component or the bracket can be fastened to it in precise alignment.

According to a further embodiment of the invention, which provides that the bracket is permanently welded to the main support bar on at least one of the alignment surfaces, an essentially even, narrow gap between the bracket and the main support bar will permit a more advantageous weld seam.

In one preferred exemplary embodiment of the cockpit crossmember, the mounting brackets are welded to the main support bar, wherein the mounting brackets extend at a preset first angle relative to the plane that is formed by transverse and vertical axes of the vehicle, and wherein the first and second alignment surfaces each for a preset second angle with said plane, the cockpit, along with the main support bar and a bracket having a pedal for a parking brake coupled to the bracket such that it can pivot, can be advantageously installed and mounted in the vehicle as a single unit; it is then necessary only to secure the power transmission mechanism, e.g. the parking brake cable, to the pedal.

According to a further development of the invention having one or more flat positioning surfaces for use in aligning an instrument module of the vehicle formed on the main support bar via internal high-pressure metal forming, an instrument panel can be supported against or aligned with at least one flat positioning surface, allowing an attachment of the instrument panel in precise alignment on the cockpit crossmember. Alternatively, or in addition to this, an alignment opening, which is designed to accept a positioning pin that is part of the instrument panel, may be provided on the main support bar. This will allow the instrument panel to be held firmly and precisely in place on the main support bar, relative to the crosswise and vertical axes of the vehicle.

In an exemplary embodiment, at least part of a cross-section of the main support bar, viewed along the lateral axis of the vehicle, comprises a section that is concave, forming a shell-shaped recess for a wiring harness of the vehicle. A wiring harness can be advantageously mounted securely on the cockpit crossmember.

Other objects, advantages and novel features of the present invention will become apparent from the following detailed description of the invention when considered in conjunction with the accompanying drawings.

BRIEF DESCRIPTION OF THE DRAWINGS

FIG. 8 is a sectional illustration of a second exemplary embodiment of a cockpit crossmember.

DETAILED DESCRIPTION OF THE DRAWINGS

Figure 1:
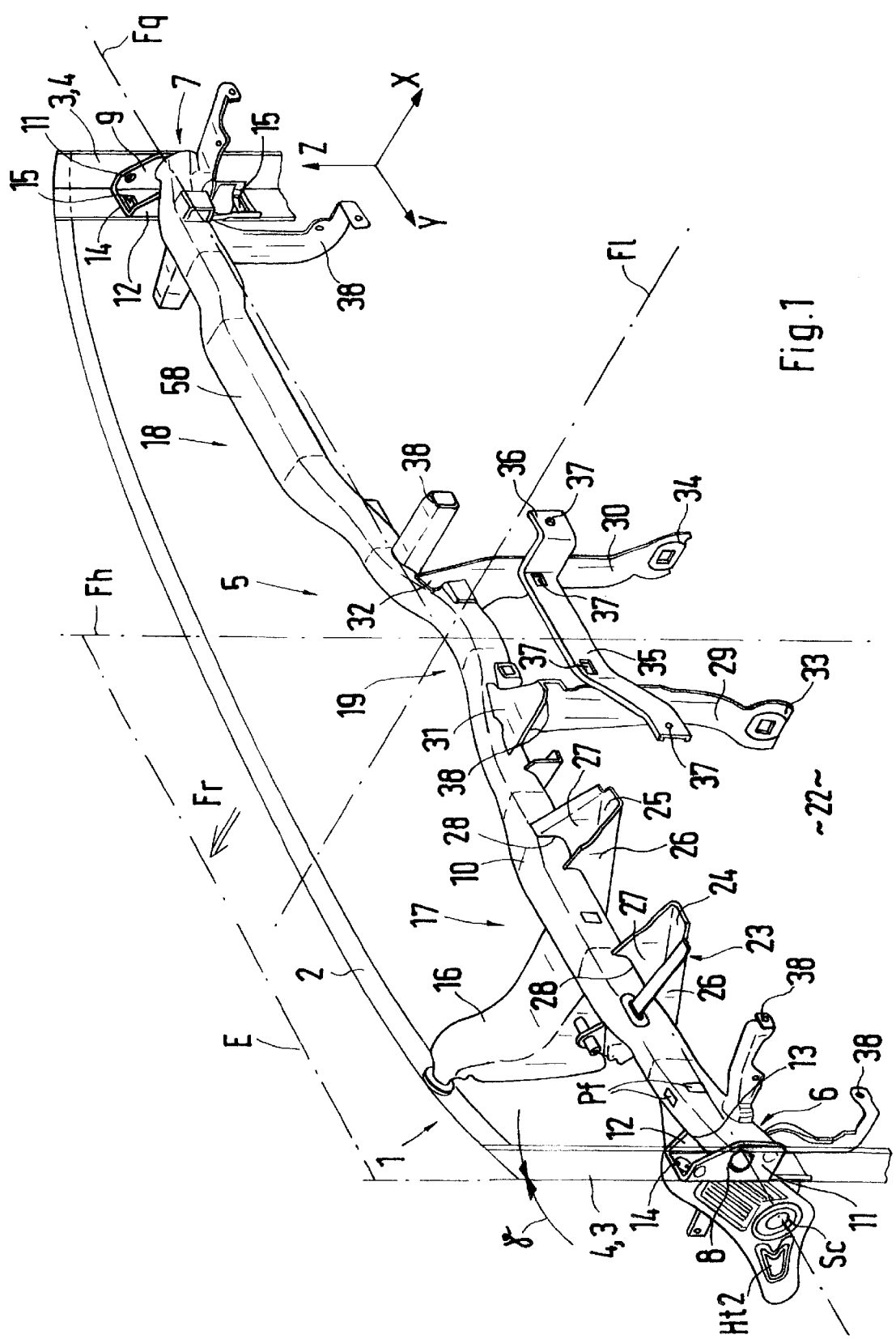
FIG. 1 shows a perspective, sectional view of a cockpit crossmember mounted on a vehicle body component according to a first exemplary embodiment.

In FIG. 1, a windshield cowl panel 2 that extends along the lower edge of a windshield, and body components 3 positioned on the sides at a distance from one another, are visible in a partial illustration of a vehicle body 1, especially a passenger car body. Each body component 3 preferably comprises an A-pillar 4, or is part of an A-pillar. The A-pillars are spaced a certain distance from one another, in the direction of transverse axis Fq of the vehicle, and extend essentially parallel to vertical axis Fh of the vehicle. A-pillars 4 may be L-shaped in cross section, with one of the legs of the L being aligned parallel or nearly parallel to transverse axis Fq of the vehicle.

In the frame forestructure of the vehicle interior between lateral body components 3, a crossmember for the vehicle instrument panel extends parallel or nearly parallel to transverse axis Fq of the vehicle. This crossmember will hereinafter be referred to as cockpit crossmember 5. It is fastened at its ends 6 and 7 to the two body components 3 that face one another. To enable this mounting, a mounting bracket 8 or 9 is positioned at each end 6 and 7 of cockpit crossmember 5, each of these brackets being connected, preferably welded, to tubular main support bar 10 of cockpit crossmember 5. Main support bar 10 is realized as a hollow, profiled component having a basically circular and/or oval cross-section. Mounting brackets 8 and 9 are U-shaped in cross-section, wherein legs 11 and 12 of the U are equipped with an open-edged recess 13, in which the main support bar 10 rests. Legs 11 of mounting brackets 8 and 9, which lie adjacent to body components 3, and base 14 of the U can be fastened to lateral body components 3 such that cockpit crossmember 5 can be aligned or adjusted in directions Y and Z relative to vehicle body 1. To allow this adjustability of cockpit crossmember 5 in directions Y and Z, slots 15 are included in mounting brackets 8 and 9 and/or A-pillars 4, and/or bolts or pins, not illustrated here, are included on A-pillars 4 and/or mounting brackets 8 and 9 and extend through slots 15. In direction X, the position of cockpit crossmember 5 is established such that bases 14 of mounting brackets 8 and 9 rest up against the legs of the L cross-section of A-pillars 4 that lie parallel to transverse axis Fq of the vehicle. In this manner, cockpit crossmember 5 can be aligned along transverse axis Fq (direction Y) of the vehicle and along vertical axis Fh (direction Z) of the vehicle, and its position can be established in direction of travel Fr (direction X or longitudinal axis Fl of the vehicle).

Between first and second mounting brackets 8 and 9, a third mounting bracket 16 is positioned on main support bar 10, via which main support bar 10 can be mounted on cowl panel 2. Main support bar 10 is equipped on its sides with side sections 17 and 18, which extend essentially parallel to transverse axis Fq of the vehicle and are preferably straight, and which may be connected to one another via a center section 19 that is curved outward opposite direction of travel Fr. The center section may also be curved in another direction. It is also possible for the center section to be straight.

Below, with reference to FIGS. 1 and 2, brackets mounted on the main support bar 10 and designed to hold bolt-on components of the cockpit, or the instrument panel, will be described. Bolt-on components of this type may include paneling sections, functional modules, controls, safety devices, meters and gauges, etc. Along transverse axis Fq of the vehicle, and viewed from left to right in FIGS. 1 and 2, a two-part bracket 20 lies next to first mounting bracket 8; this two-part bracket 20 comprises a pivot axis recess 21 designed to hold a pedal of a foot-operated parking brake, which is not illustrated here, on a first bracket section Ht1. A second bracket section Ht2 holds a weld nut Sc, which is used for mounting a pivoting axis for the pedal, which is inserted into the pivot axis recess 21. Bracket 20, with its two sword-shaped bracket sections Ht1 and Ht2 positioned with a space between them, extends downward from main support bar 10, essentially parallel to vertical axis Fh of the vehicle, into vehicle footwell 22, which is not illustrated here.

To the right, next to bracket 20, is another bracket 23 comprised of two bracket elements 24 and 25 positioned with a space between them, and a support element Ae. A steering column, which represents a bolt-on component and is not shown here, can be attached to bracket elements 24 and 25, and can also be supported against support element Ae positioned between the bracket elements. Bracket elements 24 and 25 are essentially U-shaped in cross section, wherein open-edged recesses 28 are provided in legs 26 and 27 of the U and are designed to hold at least part of the cross-section of the main support bar. Bracket 23 with its bracket elements 24 and 25 and its support element Ae, along with third mounting bracket 16, are preferably produced as a single unit, and preferably as a bent/stamped component, wherein third mounting bracket 16 and support element Ae may be U-shaped in cross-section.

Approximately at the middle of center section 19 of main support bar 10, two tunnel braces 29 and 30, positioned with a space between them—viewed in the crosswise direction Fq of the vehicle—are fastened at one end 31 or 32 (to the main support bar), while the other end 33 or 34 may be fastened to a tunnel, not illustrated here, which may be formed on an underbody structure of the vehicle, also not illustrated here. Tunnel braces 29 and 30 thus extend downward from the main support bar, essentially parallel to vertical axis Fh of the vehicle. Tunnel braces 29 and 30 hold a mounting element 35 for an air-conditioning/heating unit, which forms a bolt-on component of the cockpit. Mounting element 35 is realized as a crossmember 36, by way of example, which bridges the two tunnel braces 29 and 30 or extends between the two tunnel braces 29 and 30. Recesses 37 for mounting elements may be provided on crossmember 36 and/or the tunnel braces to allow mounting of the air-conditioning/heating unit.

Of course, additional brackets 38 may be mounted on main support bar 10 to hold a wide range of bolt-on or paneling elements or functional modules, etc. of the cockpit, which are not further illustrated here.

Figure 3:
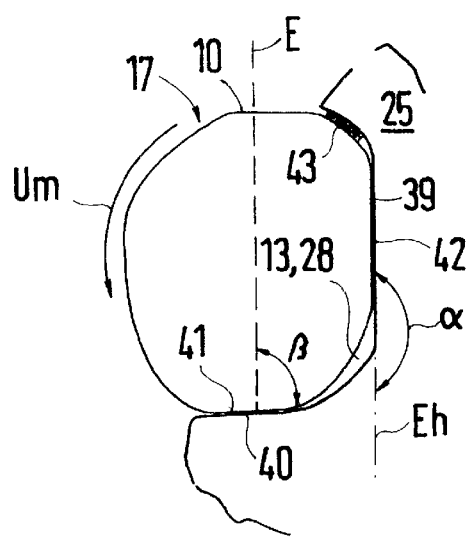

According to FIG. 3, to enable the positioning and/or alignment of each bracket 20, 23, 38 on main support bar 10, flat or even first and second alignment surfaces 39 and 40 are formed, against which flat first and second stop surfaces 41 and 42 rest. The alignment surfaces 39, 40 are spaced a certain distance from one another—around circumference Um of main support bar 10. At least one weld seam 43, which may be located in the area of alignment surfaces 39 and/or 40 and associated stop surfaces 41 and/or 42, is used to mount bracket 20, 23, 38 on main support bar 10.

Figure 4:
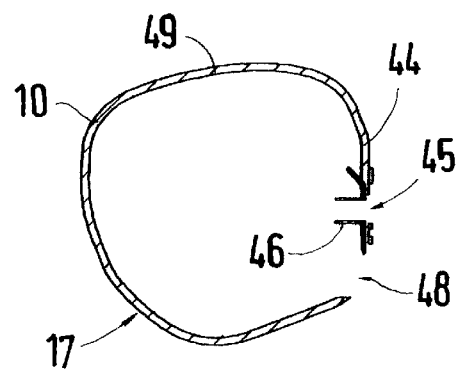

According to FIG. 4, at least one flat, third alignment surface 44 is formed on main support bar 10. This alignment surface contains at least one opening 45, into which a snap nut 46 or rivet nut 47 (FIG. 5) is inserted. The snap or rivet nut is used for mounting a bolt-on component of the cockpit, or an additional bracket. If a snap nut 46 is to be inserted in opening 45, an insertion opening 48 is provided in main support bar 10, preferably adjacent to opening 45, via which snap nut 46 can be pushed onto the peripheral wall 49 of the main support bar. Third alignment surface 44 creates a full mounting face for snap and rivet nuts 46 and 47, thus enabling a precise alignment of nuts 46 and 47 relative to the plane E.

According to FIG. 1, mounting brackets 8 and 9 are aligned on the main support bar 10 such that they extend at a preset first angle γ to a plane E that extends between the transverse axis and the vertical axis of the vehicle. This angle γ is adapted to fit the tilt of the A-pillars relative to transverse axis Fq of the vehicle, and in the exemplary embodiment shown here measures approximately 0°. Alignment surfaces 39 and 40 (FIG. 3) each form a preset second angle α and β with this plane E, and/or a supplementary plane Eh that extends parallel to the first. Second angles α and β can measure between 0° and 180°, wherein α is preferably not equal to β, and the two alignment surfaces are positioned accordingly at a distance from one another in a circumferential direction Um. When the bracket is placed on the main support bar, the first and second alignment surfaces and the stop surfaces enable a precise angular positioning of brackets 20, 23 and 38 with respect to transverse axis Fq of the vehicle, and a precise vertical alignment in direction Z. Alignment surfaces 39 and 40 of this type may also be included on main support bar 10 for the alignment of mounting brackets 8 and 9; in this case, corresponding, flat stop surfaces are also preferably provided on the edges of recesses 13 in the mounting brackets.

Figure 5:
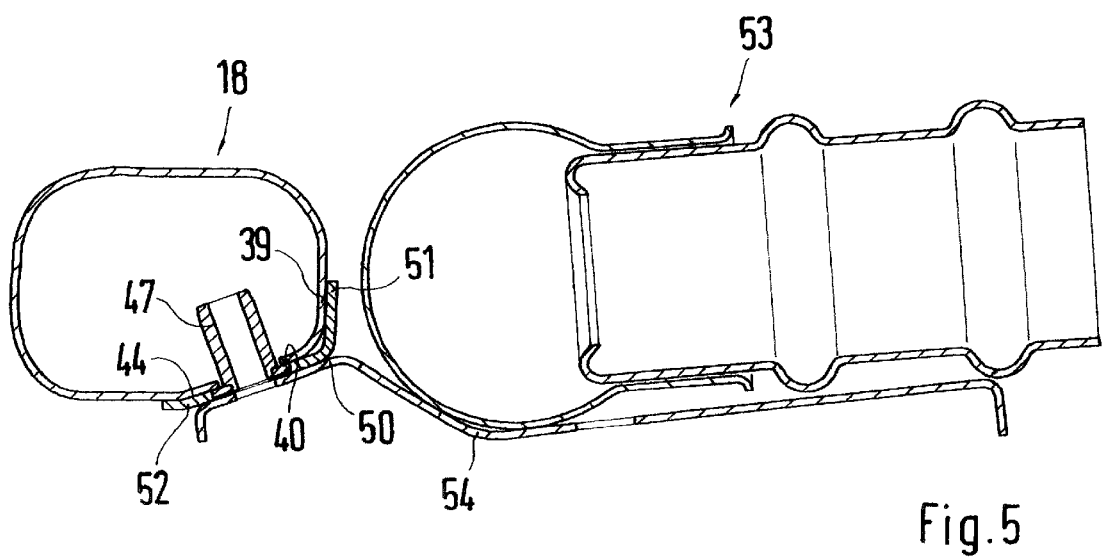

According to FIG. 5, a bracket 50 for an airbag module 53 is envisioned, which represents a bolt-on component of the cockpit. Bracket 50 comprises two bracket legs 51 and 52, which together form an angle that is ≧90. Each bracket leg 51 and 52 with its stop surface 41 or 42 rests up against the first or second alignment surface 39, 40. For mounting bracket 50, a rivet nut 47 may be envisioned, into which a mounting element (not illustrated) can be screwed to fasten bracket 50 to main support bar 10. It is also possible, however, for bracket 50 to be welded to the main support bar. A mounting tab 54 is provided for connecting airbag module 53 to bracket 50, especially to one of bracket legs 51 and/or 52.

According to FIG. 6, at least one positioning opening 55 is formed on main support bar 10 and is designed to hold a positioning pin 56 that is part of an instrument module or gauge or meter module that is not illustrated here. Outer diameter A of positioning pin 56 is preferably such that, in order to ensure an alignment in the directions Z and Y of the instrument module, it will rest within positioning opening 55 with only a small amount of play. To enable alignment of the instrument module relative to transverse axis Fq of the vehicle, at least one flat positioning surface Pf (FIG. 1) may be included on main support bar 10, on or against which the module will rest. Positioning opening 55 may lie in the positioning surface.

FIG. 7 makes it clear that the cross-section of main support bar comprises a concave, curved section 57 that forms a shell-shaped recess 58 into which, for example, a wiring harness 59 comprised of electrical cables may be emplaced. Wiring harness 59 can be fastened to the main support bar via mounting elements, such as cable binders or similar devices, not illustrated here, that encompass both main support bar 10 in a circumferential direction and wiring harness 59. Curved section 57 shown in FIG. 7—viewed in the direction of transverse axis Fq of the vehicle—extends along at least part of the length of main support bar 10. This curved section 57 and/or recess 58 is formed especially in the area of essentially straight side section 18 of main support bar 10.

Figure 2:
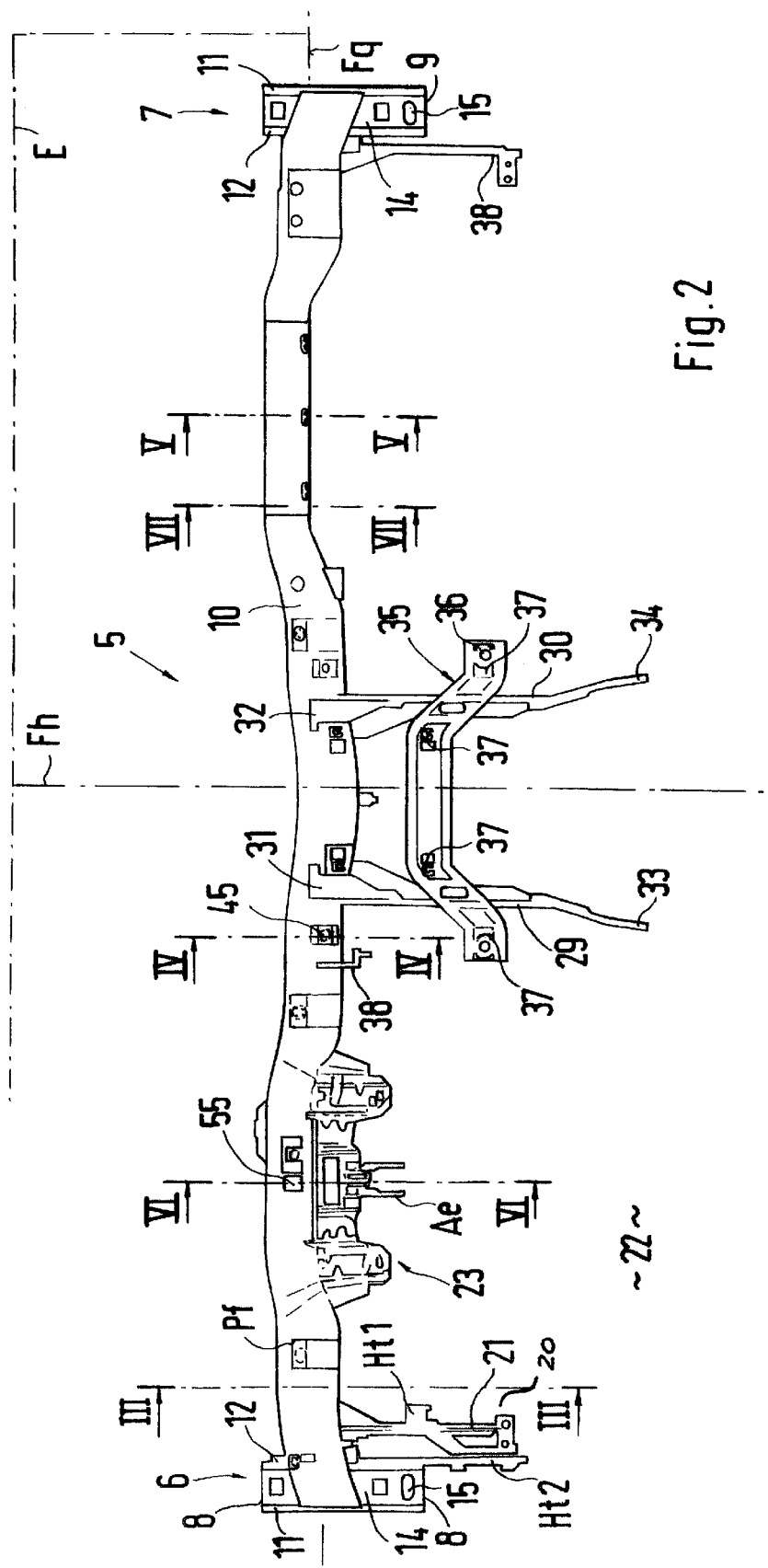
FIG. 2 shows a frontal view of the cockpit crossmember in FIG. 1, FIGS. 3–7 show cross-sectional views of the cockpit crossmember along the lines indicated in FIG. 2.

According to a second exemplary embodiment, in addition to the brackets depicted in FIGS. 1 and 2 an additional bracket 60 (FIG. 8) may be mounted to a main support bar 10, to which a deformation element 61 is attached; this element is realized especially as a knee impact bolster for vehicle occupants. Deformation element 61 possesses at least one elastically and/or plastically deformable structure 62; in the exemplary embodiment shown here, several of these structures 62 are arranged one behind the other in the direction of deformation Dr. Structures 62 may comprise honeycombed elements, for example. One or more deformation elements 61 may be mounted on at least one of side sections 17 or 18, extending into footwell 22. The deformation element or elements may be paneled with a plate.

In this case the bracket 60 is fastened via rivet nuts 47 to main support bar 10, purely by way of example. Of course, bracket 60 may also be welded to the main support bar, as is shown in FIG. 3. Preferably, however, the exemplary embodiment shown in FIG. 8 is fastened via rivet nuts 47, into which mounting elements 63, specifically bolts, can be inserted, thus allowing deformation element 61 to be replaced.

All of the alignment surfaces 39, 40 and 44, curved section 57, the various cross-sections (FIGS. 3 through 8) of main support bar 10, the shape of side sections 17 and 18, and curved center section 19 and positioning surface Pf can be produced via the internal, high-pressure metal forming of main support bar 10, also referred to as hydraulic expansion. To achieve this the main support bar is inserted in a suitable form, which is equipped with at least one recess having a flat or curved base, into which the main support bar material flows and comes to rest at the base. Openings 45, 55 and/or opening 48 can be worked into the main support bar via hydraulic expansion.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A crossmember for an instrument panel of a vehicle, which can be mounted, crosswise, in a vehicle forestructure, with two ends mounted on opposite body components, the crossmember comprising a tubular main support bar, several mounting brackets positioned on said main support bar with spaces therebetween and designed for mounting the crossmember on sides of the vehicle body, and at least one bracket designed to hold a bolt-on component of the instrument panel, wherein at least one flat alignment surface is formed on the main support bar via internal, high-pressure metal forming, and the at least one bracket includes one or more flat stop surfaces that rest up against the alignment surface, wherein at least first and second flat alignment surfaces for the at least one bracket are provided on the main support bar, wherein the two alignment surfaces, viewed in a circumferential direction around the main support bar, are spaced a certain distance from one another, wherein the at least one bracket comprises at least two flat stop surfaces, and wherein the at least one bracket is permanently welded to the main support bar.

2. A crossmember according to claim 1, wherein at least one flat, third alignment surface is formed on the main support bar and contains at least one opening, into which a snap or rivet nut can be inserted for mounting an additional bolt-on component of the instrument panel to the support bar.

3. A crossmember according to claim 1, wherein the at least one bracket is permanently welded to the main support bar on at least one of the alignment surfaces.

4. A crossmember according to claim 1, wherein the mounting brackets are welded to the main support bar, wherein the mounting brackets extend at a preset first angle relative to a plane that is formed by transverse and vertical axes of the vehicle, and wherein the first and second alignment surfaces each forms a preset second angle with said plane.

5. A crossmember according to claim 4, wherein the transverse axis of the vehicle lies within the plane of one of the first, second, and a third alignment surface, or extends parallel thereto at a distance.

6. A crossmember according to claim 1, wherein the at least one bracket is provided for an airbag module, as the bolt-on component of the instrument panel.

7. A crossmember according to claim 1, wherein the at least one bracket is provided for a steering column of the vehicle, as the bolt-on component.

8. A crossmember according to claim 1, wherein approximately at the center of the main support bar, viewed along the lateral axis of the vehicle, two brackets are attached with a space therebetween, forming tunnel brackets, which can be connected to a tunnel on an underbody structure of the vehicle, and wherein at least one flat alignment surface for each tunnel bracket is provided on the main support bar.

9. A crossmember according to claim 8, wherein mounting elements for an air-conditioning/heating unit are included on at least one of the tunnel brackets.

10. A crossmember according to claim 9, wherein the mounting element is formed by a crossmember that connects the two tunnel brackets.

11. A crossmember according to claim 1, wherein a third mounting bracket is fastened to the main support bar, and is adapted to connect the main support bar to a windshield cowl panel of the vehicle.

12. A crossmember according to claim 7, wherein a third mounting bracket and the bracket for the steering column are designed as a single unit.

13. A crossmember according to claim 1, wherein the at least one bracket comprises a pivot axis recess for a pedal of a foot-operated parking brake, and wherein the at least one bracket extends downward from the main support bar into the footwell of the vehicle.

14. A crossmember according to claim 1, wherein one or more flat positioning surfaces for use in aligning an instrument module of the vehicle are formed on the main support bar via internal high-pressure metal forming.

15. A crossmember according to claim 14, wherein at least one positioning opening designed to hold a positioning pin that is part of the instrument module, is formed on the main support bar.

16. A crossmember according to claim 1, wherein at least part of a cross-section of the main support bar, viewed along the lateral axis of the vehicle, comprises a section that is concave, forming a shell-shaped recess for a wiring harness of the vehicle.

17. A crossmember according to claim 2, wherein an additional bracket for an additional bolt-on component of the instrument panel is provided, and wherein the additioinal bracket is attached to the main support bar via screws.

18. A crossmember according to claim 2, wherein the additional bolt-on component is screwed directly to the main support bar.

19. A crossmember according to claim 15, wherein the positioning opening is formed in the positioning surface.

20. A crossmember according to claim 1, wherein at least one positioning opening is designed to hold a positioning pin that is part of an instrument module is formed on the main support bar.

21. A crossmember for a motor vehicle, which is mounted laterally in a forestructure of the vehicle and with two ends on opposite body components, comprising:

a hollow main support bar with at least one flat alignment surface formed via internal, high-pressure metal forming, a plurality of mounting brackets positioned on the main support bar and adapted for mounting the crossmember on sides of a body of the vehicle, said mounting brackets being spaced apart from one another, and at least one bracket adapted to hold a bolt-on component of a passenger compartment and including at least one flat-stop surface that rests against the at least one flat alignment surface, the bracket being permanently welded to the main support bar.

22. A crossmember according to claim 21, wherein the at least one flat alignment surface comprises at least two alignment surfaces which are provided for the bracket and are spaced a distance from one another circumferentially around the support bar.

23. A method of making a crossmember assembly for a motor vehicle, said assembly being operatively mounted laterally in a forestructure of the vehicle, comprising:

providing a hollow main support bar, forming at least first and second flat alignment surfaces on the main support bar via internal, high-pressure metal forming, positioning a plurality of mounting brackets on the main support bar spaced apart from one another and adapted to operatively mount the assembly on sides of a body of the vehicle, positioning at least one bracket which is adapted to hold a bolt-on component of an instrument panel and includes at least two flat-stop surfaces that rest against the alignment surfaces, and permanently welding the at least one bracket to the main support bar, wherein the alignment surfaces provided for the at least one bracket are spaced at a certain distance from each other circumferentially.

* * * * *